US011541850B2

(12) United States Patent
Sacristan Pamies

(10) Patent No.: US 11,541,850 B2
(45) Date of Patent: Jan. 3, 2023

(54) BRAKE BOOSTER AND PRODUCTION METHOD FOR A BRAKE BOOSTER

(71) Applicant: Robert Bosch GmbH, Stuttgart (DE)

(72) Inventor: Fernando Sacristan Pamies, Cabrils (ES)

(73) Assignee: Robert Bosch GmbH, Stuttgart (DE)

(*) Notice: Subject to any disclaimer, the term of this patent is extended or adjusted under 35 U.S.C. 154(b) by 206 days.

(21) Appl. No.: 16/957,246

(22) PCT Filed: Nov. 8, 2018

(86) PCT No.: PCT/EP2018/080697
§ 371 (c)(1),
(2) Date: Jun. 23, 2020

(87) PCT Pub. No.: WO2019/137657
PCT Pub. Date: Jul. 18, 2019

(65) Prior Publication Data
US 2020/0398798 A1   Dec. 24, 2020

(30) Foreign Application Priority Data

Jan. 11, 2018   (DE) .......................... 102018200374.2

(51) Int. Cl.
*B60T 7/04* (2006.01)
*B60T 13/10* (2006.01)
(Continued)

(52) U.S. Cl.
CPC .............. *B60T 7/042* (2013.01); *B60T 13/10* (2013.01); *B60T 13/62* (2013.01); *B60T 13/68* (2013.01);
(Continued)

(58) Field of Classification Search
CPC ........ B60T 13/747; B60T 13/10; B60T 13/62; B60T 13/68; B60T 13/568; B60T 13/662;
(Continued)

(56) References Cited

U.S. PATENT DOCUMENTS

2002/0105223 A1* 8/2002 Bacardit ............... B60T 13/569
303/114.3
2003/0085614 A1   5/2003 Bacardit
(Continued)

FOREIGN PATENT DOCUMENTS

| DE | 102014211551 A1 | 12/2015 |
|---|---|---|
| JP | 2014046857 A | 3/2014 |
| JP | 2016517827 A | 6/2016 |
| WO | 0181142 A1 | 11/2001 |

OTHER PUBLICATIONS

International Search Report for PCT/EP2018/080697, dated Feb. 28, 2019.

*Primary Examiner* — Robert A. Siconolfi
*Assistant Examiner* — San M Aung
(74) *Attorney, Agent, or Firm* — Norton Rose Fulbright US LLP; Gerard Messina

(57) ABSTRACT

A brake booster for a brake system of a vehicle, having a first input piston component, and a valve body. The brake booster has a second input piston component, which is pushed away from the first input piston component in the braking direction using a compression spring, and a locking mechanism is embodied such that when the differential travel between the booster travel and the input travel is smaller than a predefined first limit value, the second input piston component is adjustable using the compression spring together with the valve body away from the first input piston component, and when the differential travel exceeds the first limit differential travel, the second input piston component is locked in place on the first input piston component.

9 Claims, 2 Drawing Sheets

(51) Int. Cl.
*B60T 13/62* (2006.01)
*B60T 13/68* (2006.01)
*B60T 13/74* (2006.01)
*B60T 17/00* (2006.01)

(52) U.S. Cl.
CPC ............ *B60T 13/745* (2013.01); *B60T 17/00* (2013.01); *B60T 2201/12* (2013.01); *B60T 2270/404* (2013.01); *B60T 2270/82* (2013.01)

(58) Field of Classification Search
CPC .. B60T 17/00; B60T 2201/12; B60T 2270/82; B60T 2270/404; B60T 8/4018; B60T 8/4077
USPC ...................................................... 303/6.01
See application file for complete search history.

(56) References Cited

U.S. PATENT DOCUMENTS

| | | |
|---|---|---|
| 2010/0176652 A1 | 7/2010 | Arakawa |
| 2010/0176653 A1 | 7/2010 | Arakawa |
| 2011/0049971 A1* | 3/2011 | Sano ..................... B60T 13/662 303/114.1 |
| 2012/0144823 A1* | 6/2012 | Usui ..................... B60T 13/745 60/545 |
| 2013/0127237 A1* | 5/2013 | Pfeiffer ................ B60T 8/4018 303/6.01 |
| 2013/0192222 A1* | 8/2013 | Nomura ............... B60T 8/4077 60/545 |
| 2014/0090371 A1* | 4/2014 | Yoshizu ............... B60T 13/745 60/545 |
| 2015/0353067 A1 | 12/2015 | Knechtges |

\* cited by examiner

BRAKE BOOSTER AND PRODUCTION METHOD FOR A BRAKE BOOSTER

FIELD

The present invention relates to a brake booster for a brake system of a vehicle. The present invention also relates to a brake system for a vehicle. In addition, the present invention relates to a production method for a brake booster for a brake system of a vehicle, and to a method for operating a brake booster of a brake system of a vehicle.

BACKGROUND INFORMATION

German Patent Application No. DE 10 2014 211551 A1 describes an electromechanical brake booster and a method for operating such an electromechanical brake booster. The electromechanical brake booster includes an input piston, which is directly or indirectly linkable to a brake actuation element so that the input piston is adjustable from its initial position by an input travel in a braking direction with the aid of a driver braking force exerted on the brake actuation element. In addition, the electromechanical brake booster has a valve body, which is directly or indirectly linkable to a motor so that the valve body is adjustable from its initial position by a booster travel in the braking direction by an operation of the motor, the valve body in particular being adjustable with respect to the input rod in such a way that a differential travel greater than zero is possible between the booster travel and the input travel.

SUMMARY

The present invention provides a brake booster for a brake system of a vehicle, a brake system for a vehicle, a production method for a brake booster for a brake system of a vehicle, and a method for operating a brake booster of a brake system of a vehicle.

In accordance with an example embodiment, the present invention provides an (electromechanical) brake booster, which is able to be connected upstream from a master brake cylinder of a brake system of a vehicle, the brake booster being "switchable" to a state in which the first input piston component is "decoupled in terms of force" from the second input piston component through the setting of a differential travel between the booster travel and the input travel that is smaller than the predefined first brake differential travel. Since the brake actuation element, e.g., a brake pedal, is "coupled in terms of force" only to the first input piston component in this case, a driver who is operating the brake actuation element (essentially) does not feel a simultaneous braking of the second input piston component together with the valve body into the master brake cylinder connected downstream. A pressure present in the master brake cylinder is thereby able to be increased by the braking of the second input piston component and the valve body without the driver experiencing an unusual brake actuation feel/pedal feel when operating the brake actuation element/brake pedal. For example, the "early braking" into the master brake cylinder with the aid of the second input piston component and the valve body, which goes unnoticed by the driver, is able to be used for an earlier closing of clearances in the wheel brake calipers of the brake system equipped with the brake booster according to the present invention. The present invention thereby enhances the user comfort for the driver and simultaneously improves the safety standard of a vehicle equipped with the brake booster according to the present invention.

In one advantageous specific embodiment of the present invention, the brake booster includes a control device, which is configured to actuate the motor external to the brake booster or the own motor of the brake booster while considering at least one sensor signal pertaining to the driver brake force exerted on the brake actuation element and/or the input travel of the first input piston component adjusted from its initial position, so that at least for as long as the differential travel between the booster travel and the input travel is smaller than the first limit differential travel, a valve body speed of the valve body adjusted with the aid of the actuated motor is greater than an input speed of the adjusted first input piston component. The more rapid adjustment of the valve body and the simultaneously induced co-adjustment of the second input piston component may cause a brake fluid displacement from the downstream master brake cylinder that is sufficient at least for closing clearances of the wheel brake calipers connected to the master brake cylinder. Later braking by the driver into the master brake cylinder may then trigger an earlier brake pressure buildup in the wheel brake calipers.

In one further advantageous specific embodiment of the brake booster in accordance with the present invention, the valve body is able to be adjusted in relation to the first input piston component up to a differential travel between the booster travel and the input travel equal to a predefined second limit differential travel which is greater than the first limit differential travel. The valve body, adjusted by the second limit differential travel in relation to the first input piston component, preferably contacts the first input piston component in such a way that a further adjustment of the valve body in the braking direction triggers a co-adjustment movement of the first input piston component and the second input piston component locked into place thereon. The valve body may thus be adjusted by the second limit differential travel so that it "runs ahead" of the first input piston component, thereby making it possible to "prefill" a significant brake fluid volume from the downstream master brake cylinder into the connected wheel brake calipers. The second limit differential travel may easily be specified in such a way that the brake fluid volume expelled from the master brake cylinder by the "advance" adjustment of the valve body is sufficient for closing the clearances of the wheel brake calipers.

In an advantageous manner, the example control device is configured to actuate the motor external to the brake booster or the own motor of the brake booster taking the at least one sensor signal into account in such a way that as long as the differential travel between the booster travel and the input travel is smaller than the second limit differential travel, the valve body speed of the valve body adjusted by the actuated motor is greater than the input speed of the adjusted first input piston component. Such a configuration of the control device is well suited for the "ahead of time" closing of clearances in the wheel brake calipers.

In a preferred manner, the valve body, adjusted in relation to the first input piston component by the second limit differential travel, contacts the locking mechanism in such a way that through a force exerted thereon by the valve body, the locking mechanism is able to be switched to a state in which a force exerted on the second input piston component is transmittable via the locking mechanism to the first input piston component. After the "advance" adjustment of the valve body by the second limit differential travel, the first input piston component is thus coupled with the second input piston component in such a way that a pressure force which is acting counter to the braking of the second input piston component into the main brake cylinder is transmittable via the first input piston component coupled with the second input piston component to the brake actuation element, which is coupled with the first input piston component. While the driver operating the brake actuation element thus (essentially) does not feel the "running ahead" of the valve body by the second limit differential travel, the driver thereafter experiences a normal brake actuation feel (pedal feel).

For example, the locking mechanism may include an adjustable component situated in a bore in the first input piston component, and at least for as long as the differential travel between the booster travel and the input travel is smaller than the first limit differential travel, a first subsection of the adjustable component projects from a first opening of the bore and is guided in a groove developed on the valve body, and as soon as the differential travel exceeds the first limit differential travel, a second subsection of the adjustable component is pushed out of a second opening of the bore pointing away from the first opening, into a depression developed on the second input piston component by a force exerted by the valve body on the adjustable component. The locking mechanism is thus relatively easy to develop. However, it is pointed out that the development of the locking mechanism described in this instance should be interpreted merely as an example.

The previously described advantages are also ensured in a brake system for a vehicle equipped with such a brake booster.

In one advantageous embodiment of the brake system in accordance with the present invention, the brake system has at least one wheel brake caliper which is free of residual brake torque. The at least one wheel brake caliper free of residual brake torque may be understood as a low drag caliper or a zero drag caliper. Such wheel brake calipers free of residual brake torque are advantageous because no energy has to be generated for overcoming the residual brake torques during an unbraked driving state of a vehicle equipped with such a device, with the result that the unbraked travel is able to be induced with a reduced energy consumption and possibly also with lower harmful emissions. One essential advantage of the brake system described here also is that because of the advantageous development of its brake booster, the clearances of the wheel brake calipers of the brakes are able to be closed relatively quickly and early without the driver becoming aware of it during his actuation of the brake actuation element.

The afore-described advantages of the brake booster are also obtained by a carrying out a corresponding production method for such a brake booster for a brake system of a vehicle. The production method is able to be further developed according to all afore-described embodiments of the brake booster.

In addition, an execution of a corresponding example method for operating a brake booster of a brake system of a vehicle also provides the afore-described advantages. It is expressly pointed out in this context that the method for operating a brake booster of a brake system of a vehicle according to the afore-described embodiments of the brake booster is likewise able to be further developed.

BRIEF DESCRIPTION OF THE DRAWINGS

Further features and advantages of the present invention are described below with the aid of the figures.

BRIEF DESCRIPTION OF THE DRAWINGS

Figure 1:
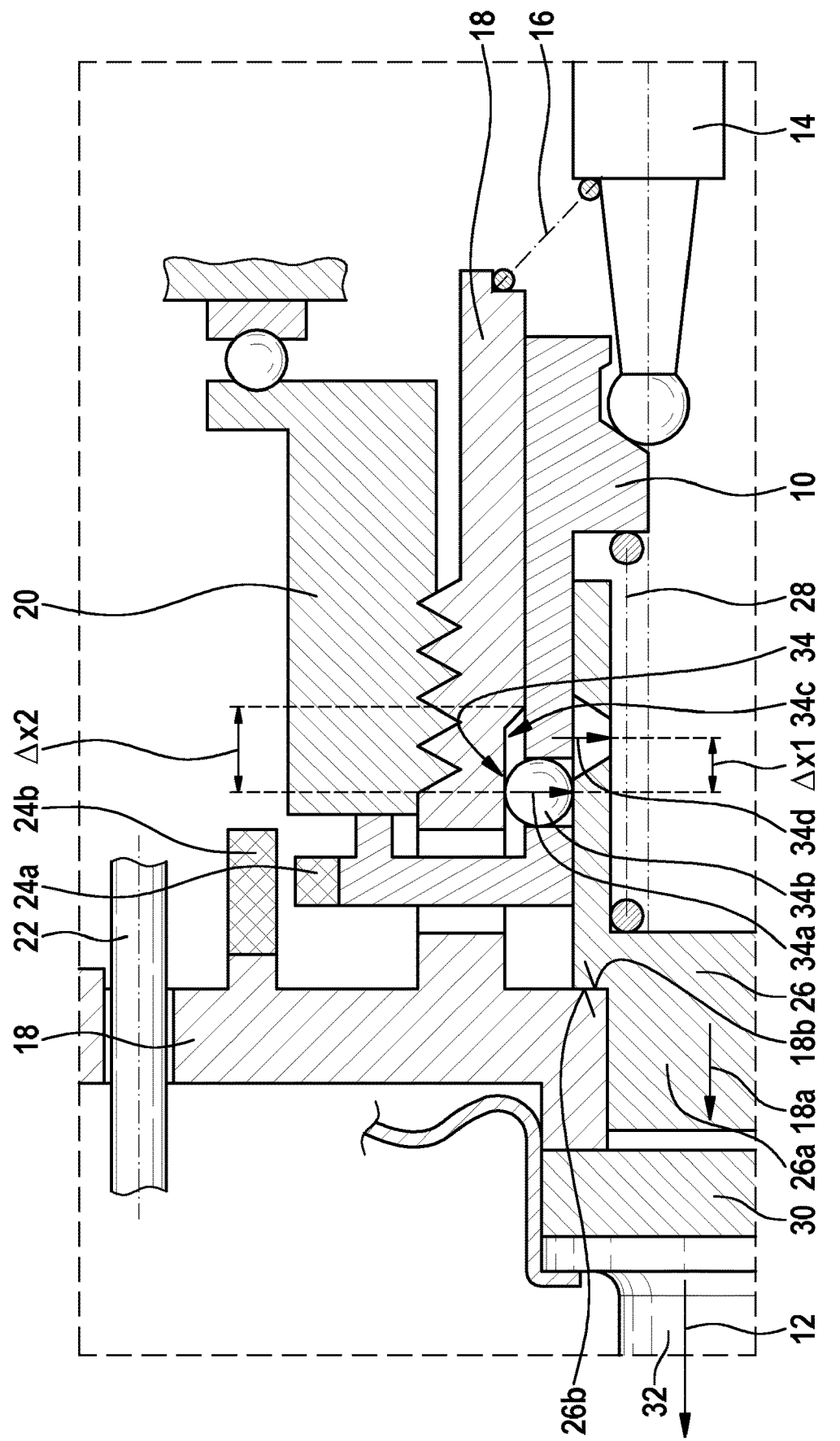

FIG. 1 shows a schematic partial representation of a specific embodiment of the brake booster in accordance with the present invention.

Figure 2:
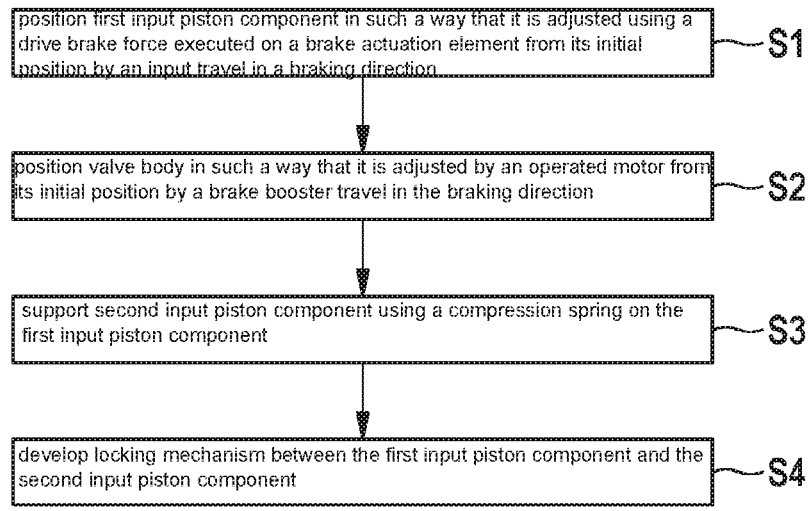

FIG. 2 shows a flow diagram to describe a specific embodiment of the production method for a brake booster for a brake system of a vehicle in accordance with the present invention.

Figure 3:
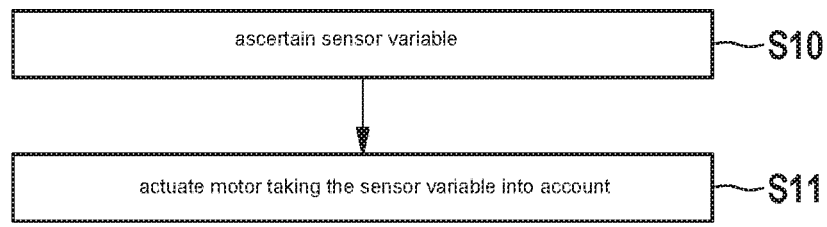

FIG. 3 shows a flow diagram to describe a specific embodiment of the method for operating a brake booster of a brake system of a vehicle in accordance with the present invention.

DETAILED DESCRIPTION OF EXAMPLE EMBODIMENTS

FIG. 1 shows a schematic partial representation of a specific embodiment of the brake booster.

The brake booster partially and schematically shown in FIG. 1 is an electromechanical brake booster, which is able to be connected/is connected upstream from a master brake cylinder (not shown) of a brake system of a vehicle/motor vehicle. A possible use of the (electromechanical) brake booster is neither restricted to a particular master brake cylinder type nor to a particular brake system type or a special vehicle/motor vehicle type.

The brake booster includes a first input piston component 10, which is directly or indirectly linkable/linked to a brake actuation element (not shown) such as a brake pedal. The linkage of first input piston component 10 to the brake actuation element is able to be realized/is realized in such a way that first input piston component 10 is able to be adjusted/is adjusted from its initial position by an input travel in a braking direction 12 with the aid of a driver brake force exerted on the brake actuation element. An initial position of first input piston component 10 may be understood as a position of first input piston component 10 which it assumes when no driver brake force is exerted on the brake actuation element (i.e., when the brake actuation element is not actuated). In the specific embodiment of FIG. 1, the brake actuation element (embodied as a brake pedal) is linked via a partially shown input rod 14 to first input piston component 10 simply by way of example, with input rod 14 being supported on a valve body 18 with the aid of a restoring spring 16.

Valve body 18 is directly or indirectly linkable/linked with a motor (not shown) such that valve body 18 is able to be adjusted/is adjusted from its initial position by a booster travel in braking direction 12 by an operation of the motor. The motor may be a motor that is external to the brake booster or a motor of the brake booster. An initial position of valve body 18 is to be understood as a position of valve body 18 in which it is situated when no force is exerted on valve body 18 by the motor (or when the motor is deactivated). In the specific embodiment of FIG. 1, a portion of valve body 18 is developed as a spindle merely by way of example, which is in an operative connection with a spindle nut 20. As a result, valve body 18 is linearly adjustable by a rotation of spindle nut 20 brought about by the operation of the motor. However, it is pointed out that the embodiment of a part of valve body 18 as a spindle, schematically shown in FIG. 1, and its linkage to the motor via spindle nut 20 should be understood only as an example. The guidance of valve body 18 via at least one guidance rod 22, schematically shown in FIG. 1, is also only of an exemplary nature.

Valve body 18 is able to be adjusted at least intermittently in relation to first input piston component 10 by an operation of the motor in such a way that a differential travel greater than zero exists between the booster travel and the input travel. The differential travel is able to be measured with the aid of a differential travel sensor 24a and 24b, for instance by fastening a magnet 24a of differential travel sensor 24a and 24b on first input piston component 10, whereas a sensor device 24b of differential travel sensor 24a and 24b is fixedly situated on valve body 18 for the purpose of locating magnet 24a.

The brake booster also has a second input piston component 26, which is pushed away from first input piston component 10 in braking direction 12 by a compression spring 28. Valve body 18 is positioned relative to second input piston component 26 in such a way that valve body 18 in its initial position, limits a relative movement of second input piston component 26, induced with the aid of compression spring 28, in relation to first input piston component 10 in its initial position. If valve body 18 is adjusted from its initial position by a booster travel greater than zero and greater than the input travel (or in other words, if a differential travel greater than zero is present), second input piston component 26 is adjustable with the aid of compression spring 28 by what is termed a relative travel in relation to first input piston component 10. The relative travel is defined as a difference between an instantaneous distance of second input piston component 26 (adjusted with the aid of compression spring 28) with regard to first input piston component 10, and an initial distance of second input piston component 26, "blocked" by valve body 18 situated in its initial position, with regard to first input piston component 10 situated in its initial position.

In the specific embodiment of FIG. 1, valve body 18 exemplarily has a through opening 18a, with a projecting section 26a of second input piston component 26 at least partially projecting into through opening 18a of valve body 18. Framing projecting section 26a, second input piston component 26, which is "blocked" by valve body 18 situated in its initial position, may have a first contact surface 26b, which contacts/touches a second contact surface 18b of valve body 18 situated in its initial position. A reaction plate 30 may be situated in braking direction 12 toward valve body 18 and projecting section 26a of second input piston component 26, via which the forces exerted thereon for the adjustment of valve body 18 and second input piston component 26 are transmittable to an output piston 32 situated in braking direction 12 toward reaction plate 30. Through an adjustment of output piston 32 induced in this manner, braking into the downstream/post-connected master brake cylinder is able to take place.

In addition, the brake booster has a locking mechanism 34, which is developed between first input piston component 10 and second input piston component 26 in such a way that as long as the differential travel between the booster travel and the input travel is smaller than a predefined first limit differential travel $\Delta x1$, second input piston component 26 is adjustable with the aid of compression spring 28 together with valve body 18 away from first input piston component 10 (by the relative travel in braking direction 12). However, as soon as the differential travel between the booster travel and the input travel exceeds first limit differential travel $\Delta x1$, the configuration of locking mechanism 34 causes second input piston component 26 to be locked/fixed in place on the first input piston component with the aid of locking mechanism 34. Once the differential travel exceeds first limit differential travel $\Delta x1$, second input piston component 26 is thus no longer able to be adjusted together with valve body 18 (farther) away from first input piston component 10 with the aid of compression spring 28.

The (electromechanical) brake booster thus "subdivides" a conventional input piston into first input piston component 10 and second input piston component 26, with the two input piston components 10 and 26 either being decoupled from each other or coupled with each other by locking mechanism 34, depending on the differential travel between the booster travel and the input travel. Locking mechanism 34 could also be called a closing mechanism. The advantages resulting from the subdivision of the conventional input piston into first input piston component 10 and second input piston component 26 are going to be described in greater detail in the following text.

At the start of an actuation of the brake actuation element, which is directly or indirectly coupled with first input piston component 10, by a driver, first input piston component 10 is adjusted from its initial position by the input travel in braking direction 12 with the aid of the driver brake force. The driver brake force exerted on the brake actuation element and/or the input travel of first input piston component 10, adjusted from its initial position, is/are detectable with the aid of at least one sensor. A rod travel sensor (not shown) is preferably used for this purpose. At least one sensor signal pertaining to the driver brake force and/or pertaining to the input travel may subsequently be output to a control device (not shown).

The control device may be a subunit of the brake booster. The control device is preferably configured to actuate the motor external to the brake booster or the own motor of the brake booster taking the at least one sensor signal into account, the actuation taking place in such a way that valve body 18 is adjusted (e.g., by a rotation of spindle nut 20) from its initial position by a booster travel (specified as a function of the driver brake force and/or the input travel) in braking direction 12. The control device is preferably configured to actuate the motor while also taking the differential travel between the booster travel and the input travel into account. Information regarding the differential travel is able to be output to the control device, for instance by differential travel sensor 24a and 24b. Alternatively or in addition, the control device may also be configured to estimate the differential travel. As a consequence, it is possible to dispense with equipping the brake booster with differential travel sensor 24a and 24b.

Preferably, the control device is configured to actuate the motor in such a way that at least for as long as the differential travel between the booster travel and the input travel is smaller than first limit differential travel $\Delta x1$, a valve body speed of valve body 18 adjusted with the aid of the actuated motor is greater than an input speed of adjusted first input piston component 10. Already at the beginning of the actuation of the brake actuation element by the driver, valve body 18 thus begins "to run ahead" in relation to first input piston component 10, so that the differential travel between the booster travel and the input travel is increased from zero to greater than zero. Second input piston component 26 is not locked/fixed in place on first input piston component 10 when the driver starts to actuate the brake actuation element (that is to say, as long as the differential travel is smaller than the predefined first limit differential travel $\Delta x1$), and is therefore pushed away from first input piston component 10 by compression spring 28 in such a way that second input piston component 26 together with valve body 18 is adjusted in braking direction 12. Put another way, second input piston component 26 is adjusted by a relative travel greater than zero (and equal to the differential travel) in relation to first input piston component 10.

The joint "running ahead" of valve body 18 and second input piston component 26 (as long as the differential travel is smaller than the predefined first limit differential travel $\Delta x1$) causes an "earlier braking" of valve body 18 and second input piston component 26 into the downstream/post-connected master brake cylinder in comparison with the adjustment movement of first input piston component 10. Through the "running ahead" of valve body 18 and second input piston component 26 in comparison with first input piston component 10, an "advance brake fluid volume" is therefore able to be displaced from the master brake cylinder into the wheel brake calipers coupled thereto even before the driver triggers a "driver-induced pressure buildup" in the master brake cylinder with the aid of his driver brake force transmitted to first input piston component 10.

At the same time, during the "running ahead" of second input piston component 26 (together with valve body 18), first input piston component 10 is therefore present in a manner that is decoupled therefrom "in terms of force". As a result, no force transmission takes place from the second input piston component 26 already braking into the master brake cylinder (together with valve body 18) to first input piston component 10. Thus, the driver actuating the brake actuation element (essentially) does not become aware of the "earlier braking" into the master brake cylinder, which is induced by the "running ahead" of valve body 18 and second input piston component 26.

When the differential travel between the booster travel and the input travel (or the relative travel between input piston components 10 and 26) is equal to first limit differential travel $\Delta x1$, locking mechanism 34 locks second input piston component 26 in place on first input piston component 10, thereby preventing a further relative movement of second input piston component 26 away from first input piston component 10. In a further adjustment of valve body 18 in relation to first input piston component 10 with an increase in the differential travel that lies above limit differential travel $\Delta x1$, second input piston component 26 remains behind. An increase in the differential travel beyond first limit differential travel $\Delta x1$ therefore does not trigger any increase in the relative travel between input piston components 10 and 26 beyond first limit differential travel $\Delta x1$.

Valve body 18 is preferably adjustable with regard to first input piston component 10 up to a differential travel between the booster travel and the input travel that is equal to a predefined second limit differential travel $\Delta x2$, with second limit differential travel $\Delta x2$ being greater than first limit differential travel $\Delta x1$. In addition, a configuration of the control device is preferred in which the control device is configured to actuate the motor (external to the brake booster or part of the brake booster), taking the at least one sensor signal into account, such that as long as the differential travel between the booster travel and the input travel is smaller than second limit differential travel $\Delta x2$, the valve body speed of valve body 18, adjusted with the aid of the actuated motor, is greater than the input speed of adjusted first input piston component 10. A further actuation of the brake actuation element thus causes a further "running ahead" of valve body 18 in relation to first input piston component 10 (and second input piston component 26 locked in place thereon with the aid of locking mechanism 34). Thus, valve body 18 is able to "run ahead" of first input piston component 10 by a differential travel up to second limit differential travel $\Delta x2$, so that an "advance brake fluid volume", which corresponds to second limit differential travel $\Delta x2$, is able to be transferred/is transferred from the master brake cylinder into the coupled wheel brake calipers before the driver triggers the "driver-induced pressure buildup" in the master brake cylinder through his driver brake force transmitted to first input piston component 10.

Even while valve body 18 is "running ahead" in relation to first input piston component 10 (and second input piston component 26 which is locked in place thereon by locking mechanism 34) by a differential travel between first limit differential travel $\Delta x1$ and second limit differential travel $\Delta x2$, the driver actuating the brake actuation element does not feel or barely feels the "earlier braking" of valve body 18 into the master brake cylinder because second input piston component 26 is held back from valve body 18 by locking mechanism 34 and thus sits at a distance from valve body 18. As a result, the driver continues to experience an advantageous (normal) brake actuation feel (pedal feel).

Preferably, valve body 18, which is adjusted by second differential travel $\Delta x2$ in relation to first input piston component 10, only contacts first input piston component 10 in such a way that a further adjustment of valve body 18 in braking direction 12 triggers a co-adjustment movement of first input piston component 10 and second input piston component 26 locked in place thereon. In addition, it is preferred if valve body 18, adjusted by second limit differential travel $\Delta x2$ in relation to first input piston component 10, contacts locking mechanism 34 so that locking mechanism 34 is able to be switched, by a force exerted thereon by valve body 18, to a state in which a force exerted on second input piston component 26 is able to be transmitted/is transmitted to first input piston component 10 via locking mechanism 34. The driver thus experiences a normal feedback starting at the instant when the driver triggers the "driver-induced pressure buildup" in the master brake cylinder through his driver brake force transmitted to first input piston component 10.

First limit differential travel $\Delta x1$ may lie in a range of 0.8 mm (millimeter) to 5.5 mm (millimeter). Second limit differential travel $\Delta x2$ may lie in a further range of 1.0 mm (millimeter) to 6.0 mm (millimeter). It is preferred if a difference between first limit differential travel $\Delta x1$ and second limit differential travel $\Delta x2$ lies between 0.1 mm (millimeter) and 0.6 mm (millimeter). Second limit differential travel $\Delta x2$ may particularly be specified in such a way that the "running ahead" of at least valve body 18 by second limit differential travel $\Delta x2$ in relation to first input piston component 10 transfers an "advance brake fluid volume" that is sufficient for closing the clearances of the wheel brake calipers from the master brake cylinder into the coupled wheel brake calipers. With the aid of a "driver-induced pressure buildup" in the master brake cylinder (using the driver brake force transmitted to first input piston component 10) executed following the "running ahead" of at least valve body 18, it is then possible to achieve a rapid pressure buildup in the wheel brake calipers.

In a preferred manner, the brake system equipped with the (electromechanical) brake booster of FIG. 1 has at least one wheel brake caliper free of residual brake torque. The at least one wheel brake caliper free of residual brake torque may be understood as a low drag caliper or a zero drag caliper. Such wheel brake calipers free of residual torque do have a greater clearance in each case, but even the greater clearance of the wheel brake calipers free of residual brake torque is quickly able to be bridged by the "running ahead" of valve body 18 or by the "advance brake fluid volume" displaced early from the master brake cylinder to the coupled wheel brake calipers. At the same time, due to the advantageous "subdivision" of a conventional input piston into a first input piston component 10 and second input piston component 26, it is ensured that the driver will not notice the "earlier braking" into the master brake cylinder (carried out for the closing of the clearances) by the "running ahead" of valve body 18. Through the "intermittent decoupling" of second input piston component 26 from first input piston component 10 as a function of the differential travel, the brake fluid volume required to close the clearances is therefore able to be displaced into the wheel brake calipers free of residual brake torque without the driver becoming aware of it. Although the brake system is equipped with the at least one wheel brake caliper free of residual brake torque, the driver receives a normal brake actuation feel (pedal feel). The advantageous brake booster therefore overcomes the conventional disadvantages of wheel brake calipers free of residual brake torque.

Merely by way of example, locking mechanism 34 includes an adjustable component 34b, which is situated in a bore 34a in first input piston component 10, and at least as long as the differential travel between the booster travel and the input travel is smaller than first limit differential travel $\Delta x1$, a first subsection of adjustable component 34b projects from a first opening of bore 34a and is guided in a groove 34c developed on valve body 18, and as soon as the differential travel exceeds the first limit differential travel, a second subsection of adjustable component 34b will be pushed/is pushed, by a force exerted by valve body 18 on adjustable component 34b, out of a second opening of bore 34a directed away from the first opening, into a depression 34d developed on second input piston component 26. Adjustable component 34b is able to be developed in spherical or ellipsoidal form, for example. However, the development of locking mechanism 34 shown in FIG. 1 should be considered only an example.

Above, a "braking phase" is described, in which adjustable components 10, 18 and 26 are adjusted in braking direction 12. As soon as the driver reduces the driver brake force exerted on the brake actuation element, he initiates a "reversal phase" during which adjustable components 10, 18 and 26 are readjusted counter to braking direction 12. During the "reversal phase", the locking of second input piston component 26 on first input piston component 10 induced with the aid of locking mechanism 34 is canceled again as soon as the differential travel becomes smaller than first limit differential travel $\Delta x1$.

FIG. 2 shows a flow diagram to describe a specific embodiment of the production method for a brake booster of a brake system of a vehicle.

In a method step S1 of the production method, a first input piston component is positioned on and/or in the subsequent brake booster in such a way that the first input piston component, which is directly or indirectly coupled with a brake actuation element during an operation of the brake booster, is adjusted with the aid of a driver brake force exerted on the brake actuation element from its initial position by an input travel in a braking direction. In addition, in a method step S2 of the production method, a valve body is positioned on and/or in the subsequent brake booster in such a way that the valve body, which is directly or indirectly coupled with a motor external to the brake booster or an own motor of the brake booster during the operation of the brake booster, is adjusted by the operated motor from its initial position by a booster travel in the braking direction. At the same time, it is ensured that the valve body is adjustable in relation to the first input piston component in such a way that a differential travel greater than zero exists (at least intermittently during the adjustment of the valve body with the aid of the operated motor) between the booster travel and the input travel.

The production method also has a method step S3 in which a second input piston component is supported with the aid of a compression spring on the first input piston component in such a way that the second input piston component is pushed away from the first input piston component in the braking direction with the aid of the compression spring. In addition, the valve body is positioned in relation to the second input rod component (or the second input rod component is positioned in relation to the valve body) in such a way that the valve body in its initial position, limits a relative movement of the second input piston component, induced by the compression spring, in relation to the first input component in its initial position.

In a further method step S4 of the production method, a locking mechanism is developed between the first input piston component and the second input piston component in such a way that as long as the differential travel between the booster travel and the input travel is smaller than a (first) limit differential travel, the second input piston component is adjusted with the aid of the compression spring together with the valve body away from the first input piston component. In addition, the locking mechanism is developed so that, as soon as the differential travel exceeds the (first) limit differential travel, the second input piston component is locked in place on the first input piston component with the aid of the locking mechanism.

The method steps S1 through S4 are able to be executed in any sequence and at least partly with an overlap in time and/or at the same time. Further features of the previously described brake booster may also be developed using corresponding further method steps of the production method.

FIG. 3 shows a flow diagram to describe a specific embodiment of the method for operating a brake booster of a brake system of a vehicle.

The method described in the further text may be executed by the afore-described (electromechanical) brake booster, for example. However, the ability to execute the method is not restricted to the use of this (electromechanical) brake booster.

In a method step S10, at least one sensor variable is ascertained regarding a driver brake force exerted on a brake actuation element of the brake system and/or regarding an input travel by which a first input piston component, which is directly or indirectly coupled with the brake actuation element, is adjusted with the aid of the driver brake force from its initial position in a braking direction, while a second input piston component is pushed away from the first input piston component in the braking direction with the aid of a compression spring.

Then, in a method step S11, a motor is actuated taking the at least one sensor variable into account, in such a way that a valve body, which is directly or indirectly coupled with the motor and positioned relative to the second input rod component in such a way that the valve body, present in its initial position, limits a relative movement of the second input piston component, induced by the compression spring, in relation to the first input piston component, which is situated in its initial position, is adjusted by the actuated motor from its initial position by a booster travel in the braking direction. The motor is at least intermittently actuated, taking the at least one sensor variable into account, so that the actuated motor adjusts the valve body in relation to the first input piston component in such a way that a differential travel greater than zero is present between the booster travel and the input travel. In addition, the motor is actuated taking the at least one sensor variable into account in such a way that a valve body speed of the valve body, adjusted with the aid of the actuated motor, is greater than an input speed of the adjusted first input piston component, at least as long as the differential travel between the booster travel and the input travel is smaller than a (first) limit differential travel predefined by a locking mechanism. The locking mechanism is developed between the first input piston component and the second input piston component in such a way that for as long as the differential travel between the booster travel and the input travel is smaller than the predefined (first) limit differential travel, the second input piston component is adjusted with the aid of the compression spring together with the valve body away from the first input piston component, while as soon as the differential travel exceeds the (first) limit differential travel, the second input piston component is locked in place on the first input piston component with the aid of the locking mechanism. The differential travel, which is also taken into account in the actuation of the motor, is able to be estimated and/or measured with the aid of a differential travel sensor.

What is claimed is:

1. A brake booster for a brake system of a vehicle, comprising:
    a first input piston component, which is directly or indirectly able to be coupled with a brake actuation element in such a way that the first input piston component is adjustable, from an initial position of the first input piston component, by an input travel in a braking direction using a driver brake force exerted on the brake actuation element;
    a valve body, which is directly or indirectly able to be coupled with a motor external to the brake booster or a motor of the brake booster such that the valve body is adjustable from an initial position of the valve body by a booster travel in the braking direction by an operation of the motor, wherein the valve body is at least intermittently adjustable with regard to the first input piston component by the operation of the motor in such a way that a differential travel greater than zero exists between the booster travel and the input travel;
    a second input piston component, which is pushed away from the first input piston component in the braking direction using a compression spring, the valve body being positioned relative to the second input piston component in such a way that the valve body in the initial position of the valve body limits a relative movement of the second input piston component, induced using the compression spring, in relation to the first input piston component in the initial position of the first input piston; and
    a locking mechanism situated between the first input piston component and the second input piston component in such a way that as long as the differential travel between the booster travel and the input travel is smaller than a predefined first limit differential travel, the second input piston component is adjustable using the compression spring together with the valve body away from the first input piston component, and as soon as the differential travel exceeds the first limit differential travel, the second input piston component is locked in place on the first input piston component using the locking mechanism, wherein the brake booster includes a control device, which is configured to actuate the motor external to the brake booster or the motor of the brake booster, taking into account at least one sensor signal regarding the driver brake force exerted on the brake actuation element and/or the input travel of the first input piston component adjusted from the initial position of the first input piston component, in such a way that at least as long as the differential travel between the booster travel and the input travel is smaller than the first limit differential travel, a valve body speed of the valve body adjusted using the actuated motor is greater than an input speed of the adjusted first input piston component.

2. A brake booster for a brake system of a vehicle, comprising:
    a first input piston component, which is directly or indirectly able to be coupled with a brake actuation element in such a way that the first input piston component is adjustable, from an initial position of the first input piston component, by an input travel in a braking direction using a driver brake force exerted on the brake actuation element;
    a valve body, which is directly or indirectly able to be coupled with a motor external to the brake booster or a motor of the brake booster such that the valve body is adjustable from an initial position of the valve body by a booster travel in the braking direction by an operation of the motor, wherein the valve body is at least intermittently adjustable with regard to the first input piston component by the operation of the motor in such a way that a differential travel greater than zero exists between the booster travel and the input travel;
    a second input piston component, which is pushed away from the first input piston component in the braking direction using a compression spring, the valve body being positioned relative to the second input piston component in such a way that the valve body in the initial position of the valve body limits a relative movement of the second input piston component, induced using the compression spring, in relation to the first input piston component in the initial position of the first input piston; and
    a locking mechanism situated between the first input piston component and the second input piston component in such a way that as long as the differential travel between the booster travel and the input travel is smaller than a predefined first limit differential travel, the second input piston component is adjustable using the compression spring together with the valve body away from the first input piston component, and as soon as the differential travel exceeds the first limit differential travel, the second input piston component is locked in place on the first input piston component using the locking mechanism, wherein the valve body is adjustable in relation to the first input piston component up to a differential travel between the booster travel and the input travel equal to a predefined second limit differential travel which is greater than the first limit differential travel, and the valve body, when adjusted by the second limit differential travel in relation to the first input piston component, contacts the first input piston component in such a way that a further adjustment of the valve body in the braking direction triggers a co-adjustment movement of the first input piston component and the second input piston component locked in place on the first input piston component.

3. The brake booster as recited in claim 2, wherein the control device is configured to actuate the motor external to the brake booster or the own motor of the brake booster, taking the at least one sensor signal into account, in such a way that as long as the differential travel between the booster travel and the input travel is smaller than the second limit differential travel, the valve body speed of the valve body adjusted using the actuated motor is greater than the input speed of the adjusted first input piston component.

4. The brake booster as recited in claim 2, wherein the valve body, when adjusted in relation to the first input piston component by the second limit differential travel, contacts the locking mechanism in such a way that through a force exerted thereon by the valve body, the locking mechanism is able to be switched to a state in which a force exerted on the second input piston component is transmittable via the locking mechanism to the first input piston component.

5. A brake booster for a brake system of a vehicle, comprising:
  a first input piston component, which is directly or indirectly able to be coupled with a brake actuation element in such a way that the first input piston component is adjustable, from an initial position of the first input piston component, by an input travel in a braking direction using a driver brake force exerted on the brake actuation element;
  a valve body, which is directly or indirectly able to be coupled with a motor external to the brake booster or a motor of the brake booster such that the valve body is adjustable from an initial position of the valve body by a booster travel in the braking direction by an operation of the motor, wherein the valve body is at least intermittently adjustable with regard to the first input piston component by the operation of the motor in such a way that a differential travel greater than zero exists between the booster travel and the input travel;
  a second input piston component, which is pushed away from the first input piston component in the braking direction using a compression spring, the valve body being positioned relative to the second input piston component in such a way that the valve body in the initial position of the valve body limits a relative movement of the second input piston component, induced using the compression spring, in relation to the first input piston component in the initial position of the first input piston; and
  a locking mechanism situated between the first input piston component and the second input piston component in such a way that as long as the differential travel between the booster travel and the input travel is smaller than a predefined first limit differential travel, the second input piston component is adjustable using the compression spring together with the valve body away from the first input piston component, and as soon as the differential travel exceeds the first limit differential travel, the second input piston component is locked in place on the first input piston component using the locking mechanism, wherein the locking mechanism includes an adjustable component situated in a bore in the first input piston component and, for at least as long as the differential travel between the booster travel and the input travel is smaller than the first limit differential travel, a first subsection of the adjustable component projects from a first opening of the bore and is guided in a groove developed on the valve body, and as soon as the differential travel exceeds the first limit differential travel, a second subsection of the adjustable component is pushed out of a second opening of the bore pointing away from the first opening, into a depression on the second input piston component, by a force exerted by the valve body on the adjustable component.

6. A brake system for a vehicle, comprising:
  a brake booster including:
    a first input piston component, which is directly or indirectly able to be coupled with a brake actuation element in such a way that the first input piston component is adjustable, from an initial position of the first input piston component, by an input travel in a braking direction using a driver brake force exerted on the brake actuation element;
    a valve body, which is directly or indirectly able to be coupled with a motor external to the brake booster or a motor of the brake booster such that the valve body is adjustable from an initial position of the valve body by a booster travel in the braking direction by an operation of the motor, wherein the valve body is at least intermittently adjustable with regard to the first input piston component by the operation of the motor in such a way that a differential travel greater than zero exists between the booster travel and the input travel;
    a second input piston component, which is pushed away from the first input piston component in the braking direction using a compression spring, the valve body being positioned relative to the second input piston component in such a way that the valve body in the initial position of the valve body limits a relative movement of the second input piston component, induced using the compression spring, in relation to the first input piston component in the initial position of the first input piston; and
    a locking mechanism situated between the first input piston component and the second input piston component in such a way that as long as the differential travel between the booster travel and the input travel is smaller than a predefined first limit differential travel, the second input piston component is adjustable using the compression spring together with the valve body away from the first input piston component, and as soon as the differential travel exceeds the first limit differential travel, the second input piston component is locked in place on the first input piston component using the locking mechanism, wherein the brake booster includes a control device, which is configured to actuate the motor external to the brake booster or the motor of the brake booster, taking into account at least one sensor signal regarding the driver brake force exerted on the brake actuation element and/or the input travel of the first input piston component adjusted from the initial position of the first input component, in such a way that at least as long as the differential travel between the booster travel and the input travel is smaller than the first limit differential travel, a valve body speed of the valve body adjusted using the actuated motor is greater than an input speed of the adjusted first input piston component.

7. The brake system as recited in claim 6, wherein brake system has at least one wheel brake caliper free of residual brake torque.

8. A production method for a brake booster for a brake system of a vehicle, the method comprising the following steps:
- positioning a first input piston component on and/or in the brake booster in such a way that the first input piston component, which is directly or indirectly coupled with a brake actuation element during an operation of the brake booster, is adjusted from an initial position of the first input piston component, by an input travel in a braking direction using a driver brake force exerted on the brake actuation element;
- positioning a valve body on and/or in the brake booster in such a way that the valve body, which is directly or indirectly coupled with a motor external to the brake booster or a motor of the brake booster during the operation of the brake booster, is adjusted using the operated motor from an initial position of the valve body by a booster travel in the braking direction and is adjustable in relation to the first input piston component in such a way that a differential travel greater than zero exists between the booster travel and the input travel;
- supporting a second input piston component, using a compression spring, on the first input piston component in such a way that the second input piston component is pushed away from the first input piston component in the braking direction using the compression spring, the valve body being positioned in relation to the second input piston component in such a way that the valve body in the initial position of the valve body limits a relative movement of the second input piston component, induced by the compression spring, in relation to the first input piston component in the initial position of the first input piston component; and
- situating a locking mechanism between the first input piston component and the second input piston component in such a way that as long as the differential travel between the booster travel and the input travel is smaller than a limit differential travel, the second input piston component is adjusted using the compression spring together with the valve body away from the first input piston component, and as soon as the differential travel exceeds the limit differential travel, the second input piston component is locked in place on the first input piston component using the locking mechanism, wherein the brake booster includes a control device, which is configured to actuate the motor external to the brake booster or the motor of the brake booster, taking into account at least one sensor signal regarding the driver brake force exerted on the brake actuation element and/or the input travel of the first input piston component adjusted from the initial position of the first input component, in such a way that at least as long as the differential travel between the booster travel and the input travel is smaller than the first limit differential travel, a valve body speed of the valve body adjusted using the actuated motor is greater than an input speed of the adjusted first input piston component.

9. A method for operating a brake booster of a brake system of a vehicle, the method comprising the following steps:
- ascertaining at least one sensor variable regarding a driver brake force exerted on a brake actuation element of the brake system and/or regarding an input travel by which a first input piston component, coupled directly or indirectly with the brake actuation element, is adjusted using the driver brake force from an initial position of the first input piston component in a braking direction, while a second input piston component is pushed away from the first input piston component in the braking direction using a compression spring; and
- actuating a motor taking the at least one sensor variable into account in such a way that a valve body, which is directly or indirectly coupled with the motor and is positioned relative to the second input rod component in such a way that the valve body in an initial position of the valve body limits a relative movement of the second input piston component, induced by the compression spring, in relation to the first input piston component in the initial position of the first input piston component, is adjusted with the aid of the actuated motor from its initial position by a booster travel in the braking direction, the motor being at least intermittently actuated taking the at least one sensor variable into account in such a way that the valve body is adjusted in relation to the first input piston component using the actuated motor in such a way that a differential travel greater than zero is present between the booster travel and the input travel;
- wherein the motor is actuated taking the at least one sensor variable into account in such a way that a valve body speed of the valve body adjusted using the actuated motor is greater than an input speed of the adjusted first input piston component at least for as long as the differential travel between the booster travel and the input travel is smaller than a limit differential value predefined by a locking mechanism, the locking mechanism being situated between the first input piston component and the second input piston component in such a way that for as long as the differential travel between the booster travel and the input travel is smaller than the predefined limit differential travel, the second input piston component is adjusted with using the compression spring together with the valve body away from the first input piston component, and as soon as the differential travel exceeds the limit differential travel, the second input piston component is locked in place on the first input piston component using the locking mechanism.

* * * * *